US011920545B2

United States Patent
Seba et al.

(10) Patent No.: US 11,920,545 B2
(45) Date of Patent: Mar. 5, 2024

(54) INTERNAL COMBUSTION ENGINE WITH INTAKE MANIFOLD INJECTION, IN PARTICULAR HYDROGEN COMBUSTION ENGINE WITH INTAKE INJECTION

(71) Applicant: Liebherr Machines Bulle SA, Bulle (CH)

(72) Inventors: Bouzid Seba, Riaz (CH); Bakir Puran, Vuisternens-en-Ogoz (CH); Olivier Fragnière, Courtaman (CH)

(73) Assignee: Liebherr Machines Bulle SA, Bulle (CH)

( * ) Notice: Subject to any disclaimer, the term of this patent is extended or adjusted under 35 U.S.C. 154(b) by 22 days.

(21) Appl. No.: 17/861,499

(22) Filed: Jul. 11, 2022

(65) Prior Publication Data

US 2023/0008932 A1 Jan. 12, 2023

(30) Foreign Application Priority Data

Jul. 12, 2021 (CH) .................................... 70040/21

(51) Int. Cl.
*F02M 21/02* (2006.01)

(52) U.S. Cl.
CPC .... *F02M 21/0296* (2013.01); *F02M 21/0206* (2013.01); *F02M 21/0245* (2013.01); *F02M 21/0278* (2013.01); *F02M 2200/855* (2013.01); *F02M 2200/856* (2013.01)

(58) Field of Classification Search
CPC ........... F02M 21/0296; F02M 21/0206; F02M 21/0245; F02M 21/0278; F02M 2200/855; F02M 2200/856; F02M 21/0281; F02M 61/145; F02M 2200/853; F02M 35/10026; F02M 35/10216; F02M 35/10242; F02M 69/044; F02M 69/465; F02M 35/10144; F02M 37/0047; F02M 63/0225; Y02T 10/30; F02B 43/00

See application file for complete search history.

(56) References Cited

U.S. PATENT DOCUMENTS

| 4,768,487 A | 9/1988 | Yamamoto et al. |
| 6,269,797 B1* | 8/2001 | Uchida ................. F02F 1/4235 |
| | | 123/468 |
| 6,308,686 B1* | 10/2001 | Mammarella ........ F02M 35/116 |
| | | 123/456 |
| 6,520,154 B2* | 2/2003 | Lamb ............... F02M 35/10078 |
| | | 123/456 |
| 2001/0025627 A1* | 10/2001 | Lamb ................... F02M 69/465 |
| | | 123/456 |

(Continued)

FOREIGN PATENT DOCUMENTS

| CA | 2841653 A1 | 4/2014 |
| DE | 4224908 A1 | 2/1993 |

(Continued)

*Primary Examiner* — Hung Q Nguyen
(74) *Attorney, Agent, or Firm* — Dilworth & Barrese, LLP

(57) ABSTRACT

An internal combustion engine has an intake manifold injection, at least two combustion chambers, at least one central rail for supplying fuel for the intake manifold injection, and at least one air distributor for supplying air to the individual combustion chambers. The central rail is attached to the air distributor, or the central rail and the air distributor are formed as an integral component.

20 Claims, 8 Drawing Sheets

(56) References Cited

U.S. PATENT DOCUMENTS

2003/0230285 A1* 12/2003 Lee .................. F02M 35/10288
123/470
2004/0261770 A1* 12/2004 Lee .................. F02M 35/10216
123/472

FOREIGN PATENT DOCUMENTS

| DE | 4418001 A1 | 12/1994 | |
|---|---|---|---|
| EP | 0801223 A1 | 10/1997 | |
| EP | 1359315 A2 * | 11/2003 | ....... F02M 35/10216 |
| EP | 1375898 A2 | 1/2004 | |
| JP | 01035072 A * | 2/1989 | |
| WO | WO-9727393 A1 * | 7/1997 | ....... F02M 35/10216 |
| WO | WO-9727398 A1 * | 7/1997 | ........... F02M 61/145 |
| WO | WO-0042314 A1 * | 7/2000 | ....... F02M 35/10085 |

* cited by examiner

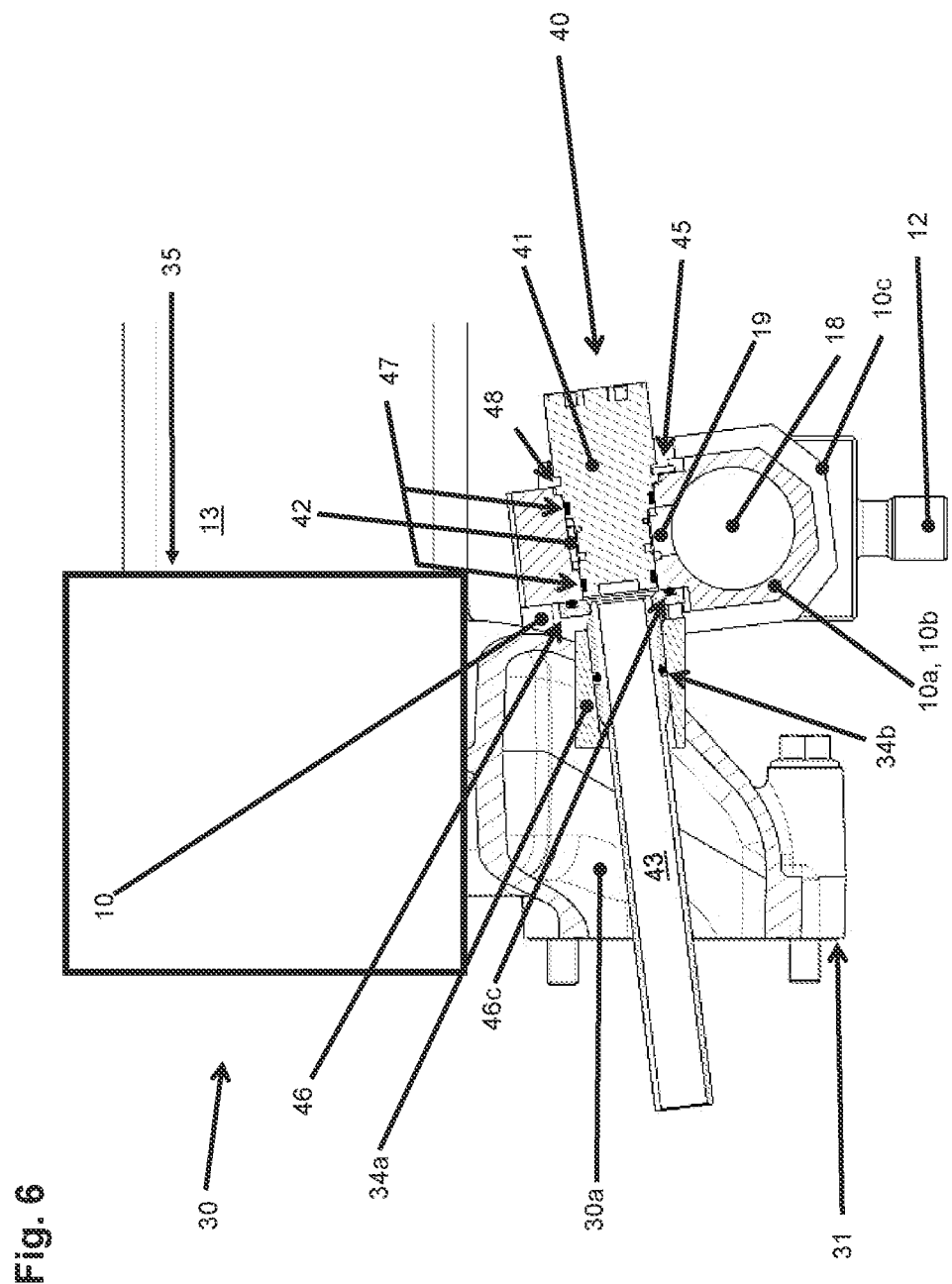

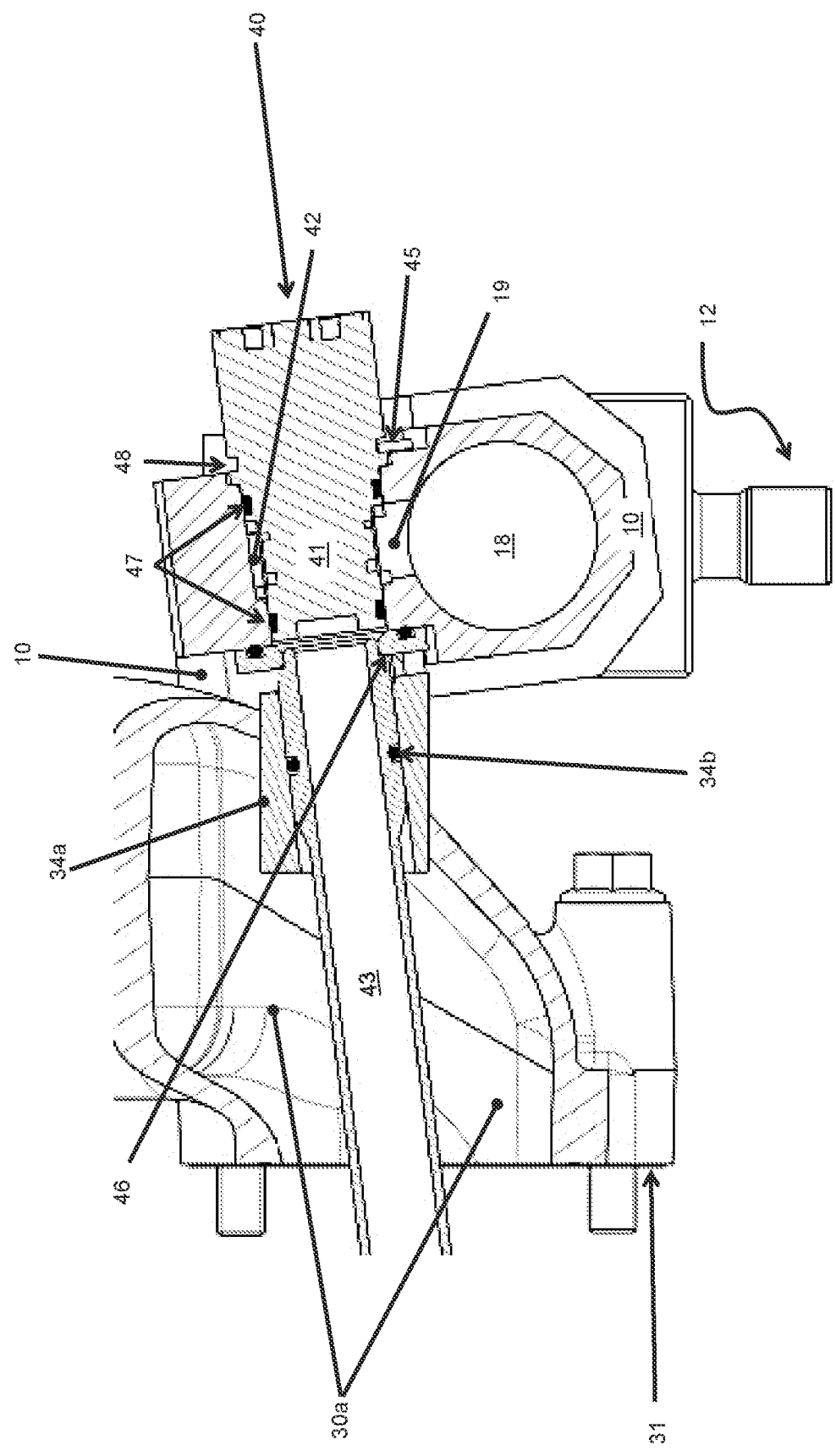

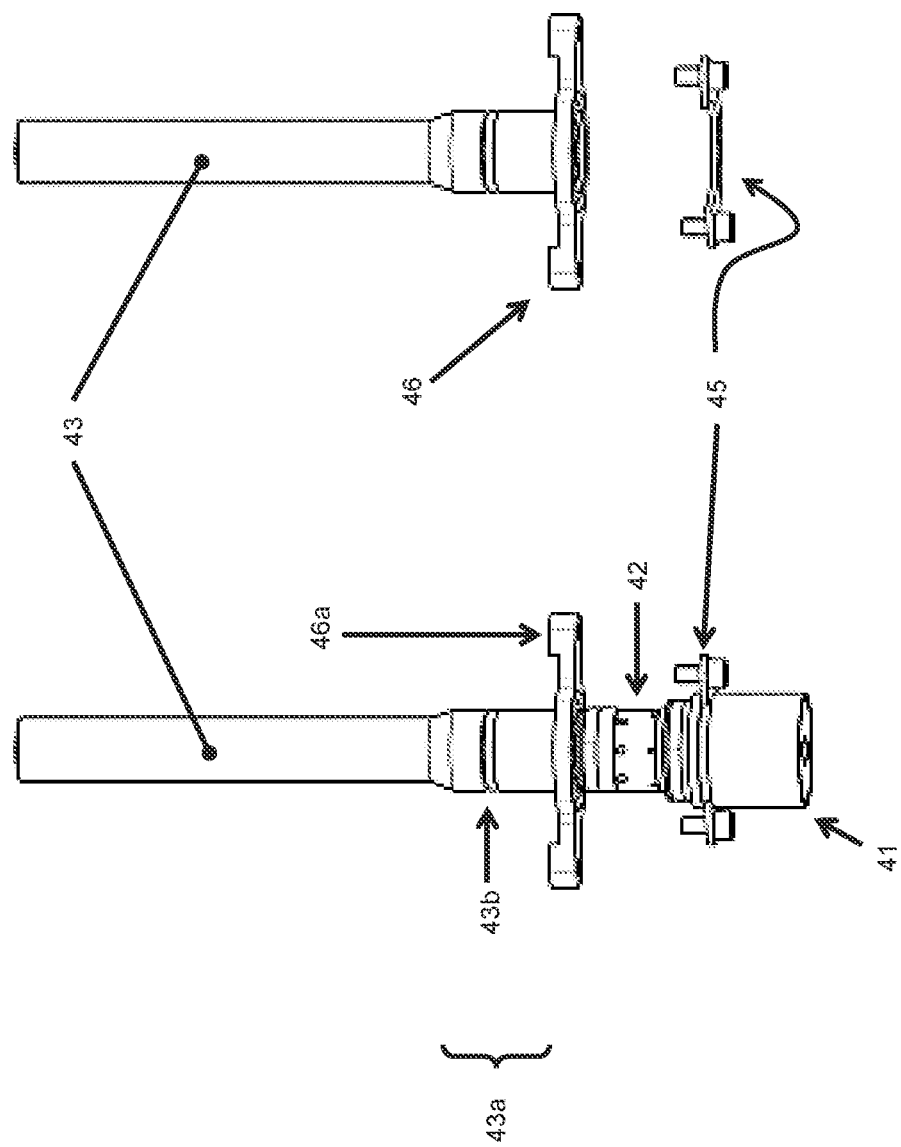

INTERNAL COMBUSTION ENGINE WITH INTAKE MANIFOLD INJECTION, IN PARTICULAR HYDROGEN COMBUSTION ENGINE WITH INTAKE INJECTION

BACKGROUND OF THE INVENTION

The invention relates to an internal combustion engine with intake manifold injection comprising at least two combustion chambers, at least one central rail for supplying fuel for the intake manifold injection and at least one air distributor for supplying air to the individual combustion chambers.

The principle of fuel intake manifold injection is still used, especially for dynamically operated gas engines. Such a concept also enables cylinder-specific fuel injection, but with much lower efforts than direct injection. In order to fully exploit the potential benefits of direct injection, the fuel must be supplied at a correspondingly high pressure level.

As generally known, gaseous fuels in high-pressure accumulators for on-board are widely carried along. Typical pressure levels of high-pressure accumulators used in vehicle applications are, for example, 350 bar and 700 bar. If, in the case of direct injection, an injection pressure in the order of 300 bar is required, a large to very large proportion of the available storage capacity cannot be used without the possibility of on-board compression, whereby corresponding compression devices suitable for on-board use are difficult or impossible to obtain today.

There are also fuels that can be liquefied and stored in liquid form with moderate effort. The best-known example is LPG (liquefied petroleum gas), which is better known in Germany as Autogas. Although such fuels could still be compressed in their liquid state, and thus with comparatively little effort, when they are fed from the fuel storage tank to the internal combustion engine, they are still frequently fed to the combustion chamber by means of intake manifold injection.

With regard to hydrogen vehicles, the storage of hydrogen is becoming increasingly important. The fuel storage system does not contain molecular hydrogen in its pure form, but a preferably liquid hydrogen storage medium. By selecting a suitable medium, on the one hand a significantly higher volumetric energy density can be achieved than by pressurized storage of molecular hydrogen and, on the other hand, storage is by far not as costly as storing molecular hydrogen in liquid or cryogenic form. In order for molecular hydrogen to eventually be provided to the internal combustion engine, on-board reforming is required. However, known reforming processes only work to a limited extent or not at all if the hydrogen storage medium is fed to the reformer at excessively high pressure. Consequently, the molecular hydrogen delivered at an outlet from the reformer can only have a comparatively low pressure, which is why intake manifold injection is predestined for those hydrogen engines that obtain their hydrogen from a hydrogen storage medium.

For this reason, the principle of manifold fuel injection is still important, especially in dynamically operated gas engines. Internal combustion engines with intake manifold injection usually comprise a pressure accumulator known as a rail, to which the fuel is first fed from the primary fuel tank. The fuel required is then fed from the rail to the central injector or the individual injectors. The required fuel is then supplied from the rail to the central injector or the individual injectors for injection. In most cases, a common rail is used for all combustion chambers of the internal combustion engine, at least for all combustion chambers arranged next to each other in a common row of the engine, which in this case is referred to as the central rail for the sake of precision. In the case of multi-point intake manifold injection, one injector per combustion chamber must be supplied with fuel from the central rail. As the number of cylinders increases, so does the amount of piping between the central rail and the respective injectors, which not only increases costs and maintenance, but also takes up more installation space.

SUMMARY OF THE INVENTION

The object of the present invention was therefore to reduce the number of necessary individual pipes between the central rail and the injectors of an internal combustion engine. Likewise, it is desirable to allow easy interchangeability of the injectors while ensuring isolation of electrical areas of the injector from the fuel area.

This object is achieved by an internal combustion engine according to the features herein. Advantageous embodiments are the subject of the description herein.

In accordance with the invention, it is proposed to mount the central rail directly or at least in the immediate vicinity of the air distributor. Alternatively, the central rail and the air distributor can also be formed by a common component, i.e. the respective functional group of the central rail and that of the air distributor are combined into an integral component. In a preferred embodiment, this is then a one-piece casting.

The core idea of the invention is to arrange the central rail in the immediate vicinity or directly on the air distributor. Any connections can be integrated directly into the central rail and/or the air distributor or formed by simple wall openings provided with an appropriate seal, which can significantly reduce the number of externally arranged line pipes.

The internal combustion engine can have several central rails and/or air distributors. For example, in the case of a V-engine, a shared air distributor and/or a shared central rail can be provided for each cylinder bank.

If the central rail and the air distributor are separate components, they can be fixed to each other by means of screw connections. A galvanic connection of the two components is also conceivable.

In a preferred embodiment, one or more injectors are at least partially integrated into the central rail or installed therein or at least directly attached thereto. Such a design simplifies the fuel supply from the central rail to the respective injectors. In a particularly preferred embodiment, any fluid connections extending via exposed lines between the central rail and the injectors supplied via this central rail can be dispensed with. This results in a particularly short connection path between each injector and the central rail, which can also be made considerably safer because external line arrangements can be dispensed with for the installation of these connections.

If the air distributor and central rail are manufactured as a one-piece or integral component, in particular as a molded part, the necessary internal cavities are located at least within such a component. Any internal connections of the cavities of the central rail and air distributor as well as internal separations or other recesses including external connections are thus already formed or at least prefabricated in or on the integral component. Finishing, i.e. the reworking of certain recesses to achieve particularly high dimensional accuracy and/or particularly high surface quality, the cutting of threads, etc. up to completion, is then carried out on this integral component, in which the functions of the air distributor and the central airfoil are combined.

As already indicated above, one or more injectors are advantageously at least partially installed in the central rail. It is conceivable that an installed injector is located entirely within the central rail. However, a preferred installation method is one in which a certain component section of the injector is located outside the central rail and is thus accessible from the outside. Particularly preferably, this exposed section of the injector comprises the necessary components that enable actuation of the injector. In particular, these can be the valve elements or the electrical control elements for valve actuation. In particular, it makes sense to arrange electrical actuating components outside the central rail in order to ensure spatial separation and compartmentalization between the electrical components and the fuel or fuel-air mixture.

Another advantage is that access to the at least one injector from the outside facilitates maintenance and repair work.

In its installed position, the longitudinal axis of the at least one injector is preferably perpendicular to the longitudinal axis of the central rail.

It may be convenient for an injector to be removable and installable from outside the central rail from its installation position on the central rail, and no disassembly of the central rail is required for this purpose. In an advantageous embodiment of the invention, the entire injector is accessible and removable and/or installable from outside. Alternatively, only a specific section of the injector is accessible from the outside and can be removed separately from the rest of the injector, wherein in one embodiment the actuating mechanisms of the injector are accommodated in the external section, making it particularly easy and uncomplicated to change the mechanics and/or electrics of an injector.

The injector can be fixed to the central rail, for example, by means of a fixing element that can be mounted on the outside of the central rail. For example, it is conceivable to have a fixing element that is firmly connected to the injector, in particular a retaining claw, which rests against the outer wall of the central rail when it is inserted into the central rail and can be fixed there, in particular screwed in place.

This means that all that is required to install and remove the injector or at least the injector valve is to loosen or fix the fixing means.

For the fluid connection between the central rail and the injector, it can be provided that the injector has an outer annular groove on its outer circumference which, after assembly, lies inside the central rail, in particular in a fuel-containing volume of the central rail. One or more radial bores in the bottom of the annular groove are used to feed fuel from the central rail to the injector nozzle.

The proposed invention and its advantageous embodiments can be used for single-point intake manifold injection as well as multi-point intake manifold injection. It is also conceivable to use it in a mixed form of single-point and multi-point intake manifold injection.

In the case of single-point intake manifold injection or the aforementioned mixed form, the injector preferably extends from the central rail into the air distributor, with the injector nozzle opening into the volume of the air distributor. The injector or its fuel supply channel thus penetrates the two adjacent housing walls of the central rail and air distributor or, in the case of an integral configuration, the common ones. The fuel-air mixture is formed in the air distributor, from where it enters the intended inlet ducts of the combustion chambers.

If the injection concept of the internal combustion engine is based instead on multi-point injection, the fuel supply channel of a fuel injector extends completely through the air distributor to the cylinder head, in particular the respective inlet channel pronounced there for supplying the fuel-air mixture to the combustion chamber concerned. A respective fuel supply path integrated in an injector extends specifically through the two separate, adjacent housing walls of the central rail and the air distributor or through their common partition wall, penetrates the entire width of the air distributor and opens directly at the cylinder head or extends to a certain extent into the inlet duct contained therein. Consequently, the fuel is injected directly into the intake port, where mixing occurs with the airflow discharged from the air distributor.

The central rail itself can be formed in one piece. Alternatively, a multi-part design is also conceivable. It is conceivable to divide it longitudinally into one section. At least one sectional part can have the fuel connection for connection to the fuel path or the primary fuel path. According to an advantageous embodiment, the section part having the fuel connection may be connectable to the other section parts with different orientation of the fuel connection. This results in a certain flexibility of the orientation of the fuel connection of the central rail, which provides a certain flexibility for the attachment situation to the internal combustion engine or its installation in the higher-level system, e.g. a road vehicle or a mobile working machine, etc.

The internal combustion engine further comprises a control system that enables defined influencing of the injection process, in particular the delivered fuel quantity and/or the start and end of a respective fuel injection interval. The control system can be configured to carry out a single-point injection process and/or multi-point injection process by means of intake manifold injection. A preferred embodiment of the control system enables sequential cylinder-specific fuel supply.

The primary fuel is preferably a gaseous fuel, particularly preferably hydrogen, i.e. the internal combustion engine in the case of the latter a hydrogen engine.

BRIEF DESCRIPTION OF THE DRAWINGS

Further advantages and features of the invention will be explained in more detail below with reference to an exemplary embodiment shown in the figures. The figures show in:

FIG. 6: an enlarged detailed view of a section of FIG. 5, FIG. 7: a further enlarged representation of the detailed section of FIG. 6, and FIG. 8: individual illustrations of an injector with fixing elements.

DESCRIPTION OF THE PREFERRED EMBODIMENTS

Figure 1:
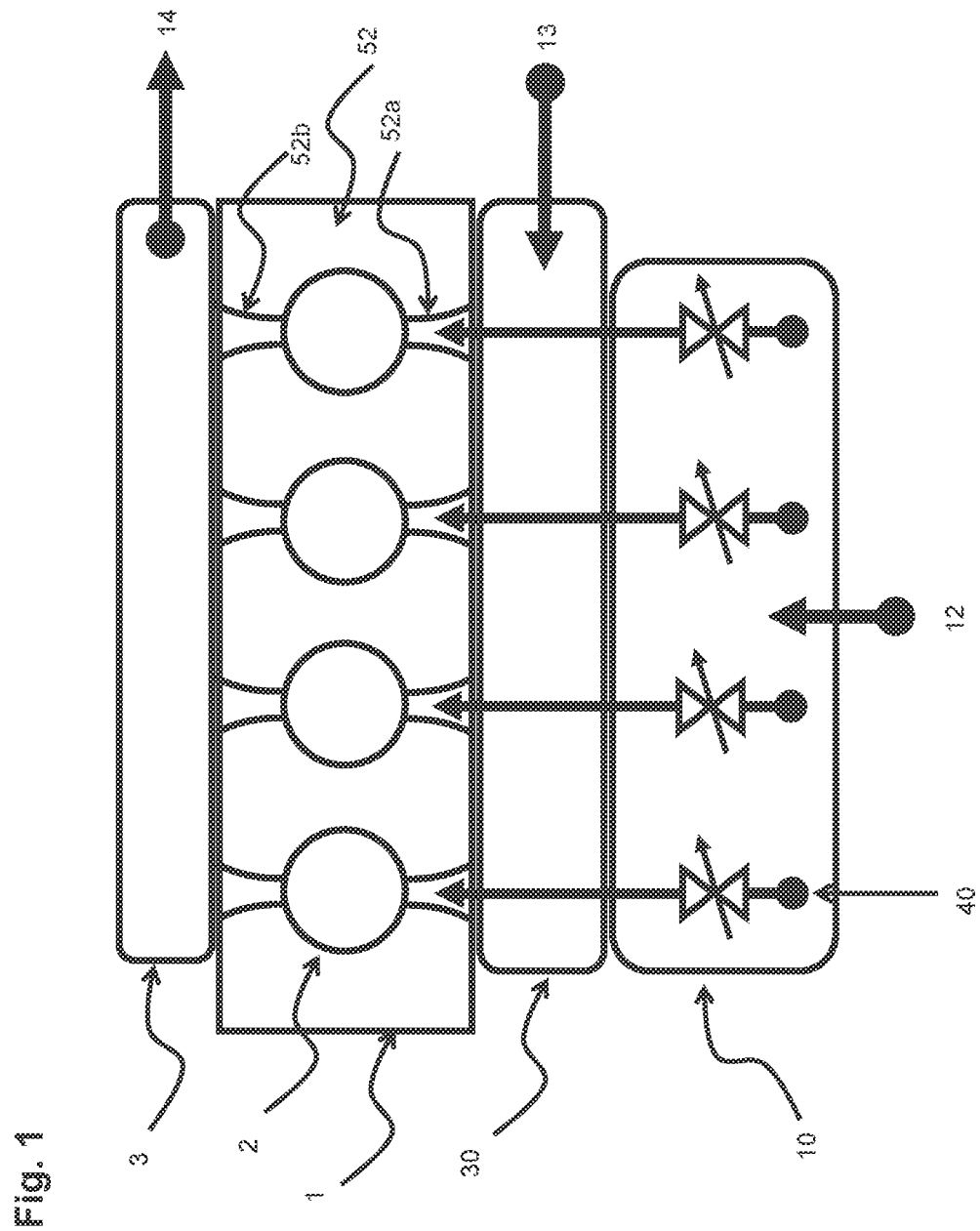
FIG. 1: a schematic representation of an internal combustion engine according to the invention.

FIG. 1 shows a schematic representation of the internal combustion engine according to the invention. FIGS. 2 and FIGS. 4 to 7 show a specific example of the components central rail 10, air distributor 30 and injectors 40. FIG. 3 is limited to a specific example of an air distributor 30. First, however, the principle of the invention will be described in more detail on the basis of the schematic representation in FIG. 1. The internal combustion engine shown there comprises at least two combustion chambers 2; four combustion chambers 2 are shown. An internal combustion engine according to the invention comprises at least two combustion chambers 2 which have a common air distributor 30 and whose fuel is supplied via a jointly used rail or central rail 10 by means of intake manifold injection. (Preferably, all combustion chambers 2 arranged along a cylinder bank 1 have a common air distributor 30 and a common central rail 10.

The core of the invention is that the central rail 10 is located in the immediate vicinity of the air distributor 30 and is preferably mounted directly on the air distributor 30, e.g. by screw connections and/or by galvanic bonding. Particularly preferably, the two functional elements air distributor 30 and central rail 10 can also be manufactured as an integral component. In the embodiment according to the invention, the injectors 40 are installed in or attached to the central rail 10 in such a way that there is a direct fuel supply from the central rail 10 into an injector 40, i.e. that there is a direct fluid connection without a line pipe and without penetration of a further component between rail 10 and injector 40. In the illustration according to FIG. 1, the exhaust gas path 14 is still indicated. The exhaust gas enters the common exhaust manifold 3 via the exhaust ports 52b of the combustion chambers 2. The schematic representation of these exhaust ports 52b is limited to the cylinder head 52. Since it is not directly related to the invention, the suggestion of a design of the flow paths in the symbolized air distributor 30 and the symbolized exhaust manifold 10 has been omitted for the sake of clarity.

In the case of a combination of the two functional elements air distributor 30 and central rail 10 to form a one-piece component, which corresponds to a preferred embodiment, for example, a blank could be produced, preferably as a molded part or casting, which already comprises the internal cavities, internal connections, internal separations and, above these, the other recesses including the external connections required for an air distributor 30 and for a central rail 10, wherein the latter, after completion of an e.g. cast blank, can possibly only be present at such a production stage which requires reworking. Cast blank, for example, may only be present at such a manufacturing stage that requires post-processing. Finishing, e.g. reworking of recesses and surfaces requiring particularly high dimensional accuracy and/or particularly high surface quality, cutting of threads, etc. until completion, would then be carried out on this blank or molded part. Insofar as the two functional elements air distributor 30 and central rail 10 are designed as separate components, unlike in the preferred embodiment, additional precautions would have to be taken in order to achieve their functionally correct connection. This relates to the finishing of certain surfaces and the sealing of certain joints between these two components. In the case of an integral component, such measures are not required for the transition area between the air distributor 30 and the central rail 10.

The principle of intake manifold injection can be realized by generating the fuel-air mixture in the air manifold 30 due to the nature of the parts, i.e. the injector or injectors 40 inject the fuel directly into the air manifold 30. Such a principle is referred to as single-point intake manifold injection. In this case, the injector 40 extends through the two separate abutting walls of the central rail 10 and the air distributor 30, or through the common partition of these two functional elements, and the injector nozzle 30 terminates in the air distributor 30, wherein the meeting of the fuel and the air occurs in the air distributor 30. From there, the fuel-air mixture can enter the provided inlet ducts 52a of the combustion chambers 2.

Figure 2:
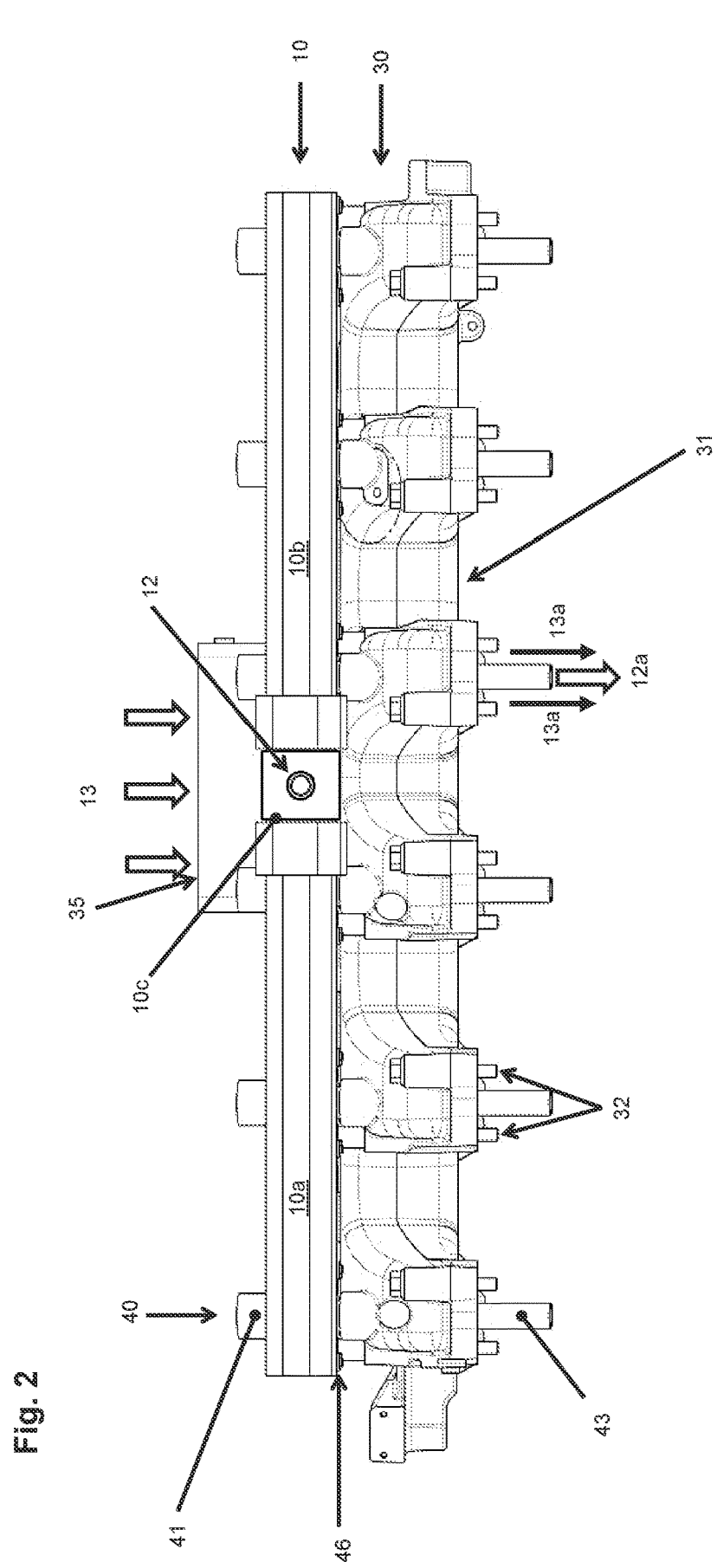
FIG. 2: a view of the air distributor with the central rail attached and the injectors mounted.
Figure 3:
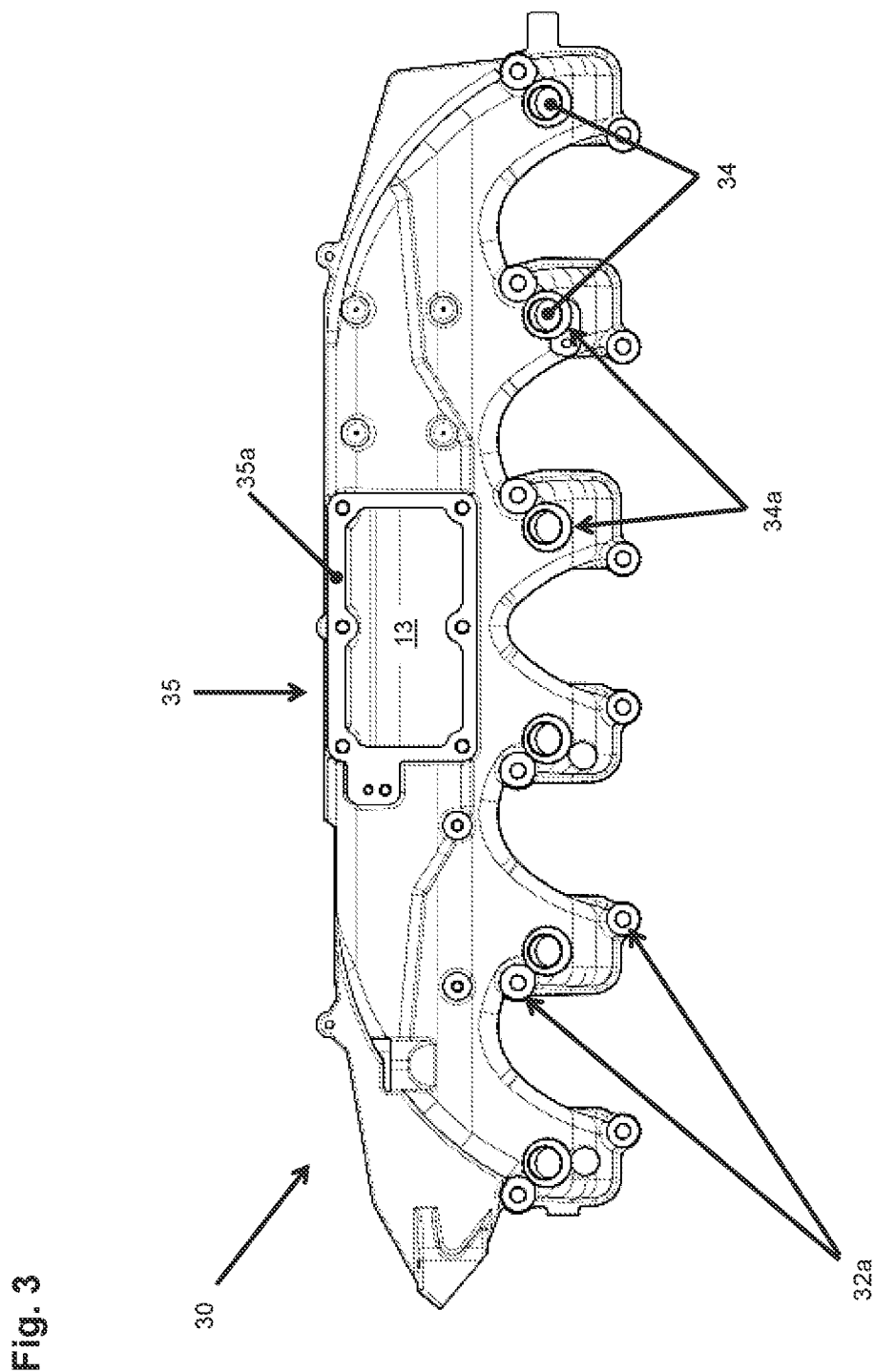
FIG. 3: the air distributor of FIG. 2 in an individual representation with a view diametrically opposed to the mounting surface of the air distributor for mounting on the internal combustion engine.
Figure 4:
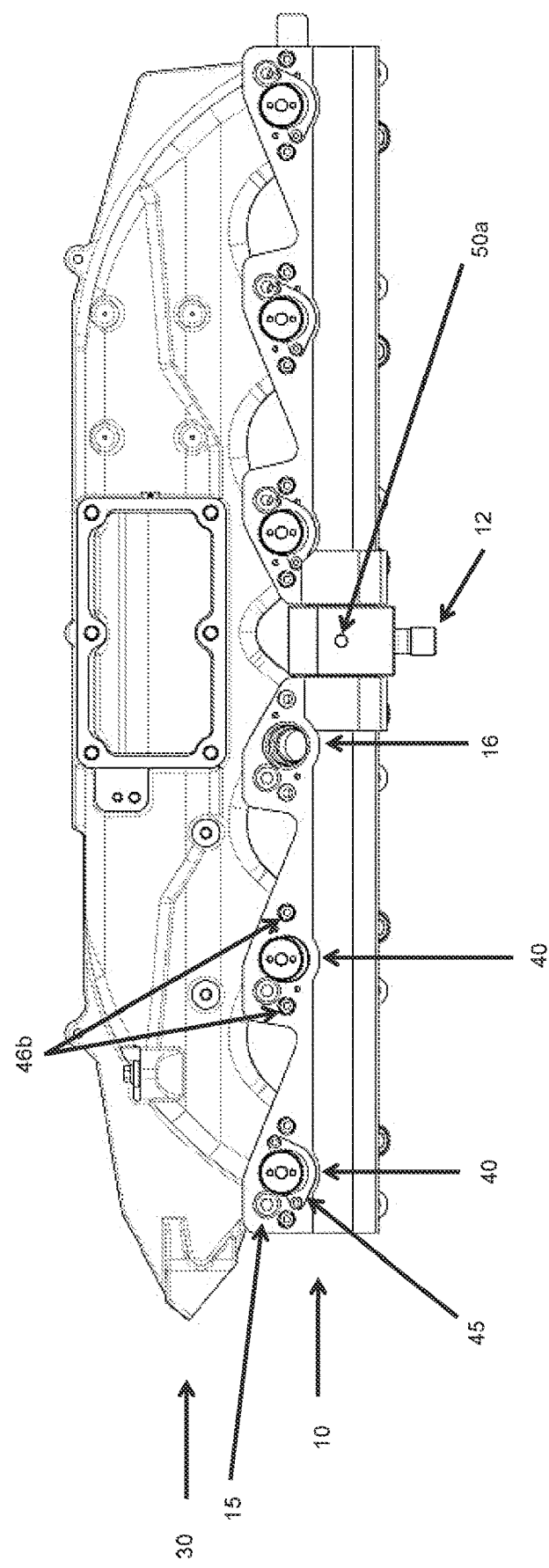
FIG. 4: a representation of the air manifold of FIG. 3 with the central rail attached and the injectors partially mounted.

In the principle of multi-point injection as prepared in the embodiment example of FIG. 3 and implemented in FIGS. 2 and 4, the fuel is injected by the injectors 40 directly into the respective cylinder head 52, in particular into the inlet port 52a provided there. For this purpose, the injector 40 must extend through the two separate abutting walls of the central rail 10 and the air distributor 30 or through the common partition wall of these two functional elements and preferably extend across the entire width of the air distributor 30 so that the injector nozzle 43 opens into the inlet port 52a already provided in the cylinder head 52, whereby the meeting of the fuel and the air only takes place in the immediate vicinity of the inlet valve or inlet valve pair.

FIG. 2 shows a bottom view of the air distributor 30 with attached central rail 10 and inserted fuel injectors 40. By means of the air distributor 30 and the central rail 10, a total of six combustion chambers 2 are supplied with a fuel-air mixture in the example shown. The air distributor 30 is attached to the cylinder head 52 of an internal combustion engine by means of the contact surface marked 31 (see FIG. 5); for each combustion chamber 2, at least two fastening screws 32 are provided for screwing to the cylinder head 52, which are passed through the sleeves 32a cast onto the air distributor 30. The injector nozzle 43 is fixed to the air distributor 30 by means of mounting screws 15. The individual fuel injectors 40 are installed in the central rail 10 from the side facing away from the air distributor 30 and in such a way that the section 41 of the injector 40 having a valve function is located at least partially within the central rail 10, the longitudinal section of the injector 40 which comprises the annular groove 42 serving to feed fuel into the injector 40 being located completely within the central rail 10 (see FIG. 6). As can be seen in the illustration, the injector nozzle 43 has a tubular shape which is carried through the volume of the air distributor 30. After assembly, the injector nozzle 43 opens into the respective inlet duct 52a of the combustion chamber 2 to be supplied, which can be seen in the sectional view of FIG. 5. Since a separate injector 40 is provided for each combustion chamber 2, and fuel is injected into the inlet port 52a, this is a multi-point intake manifold injection system. Above the mounted injectors 40 is the connection 35 with the contact surface 35a for the charge air supply line 13 to the air distributor 30.

Figure 5:
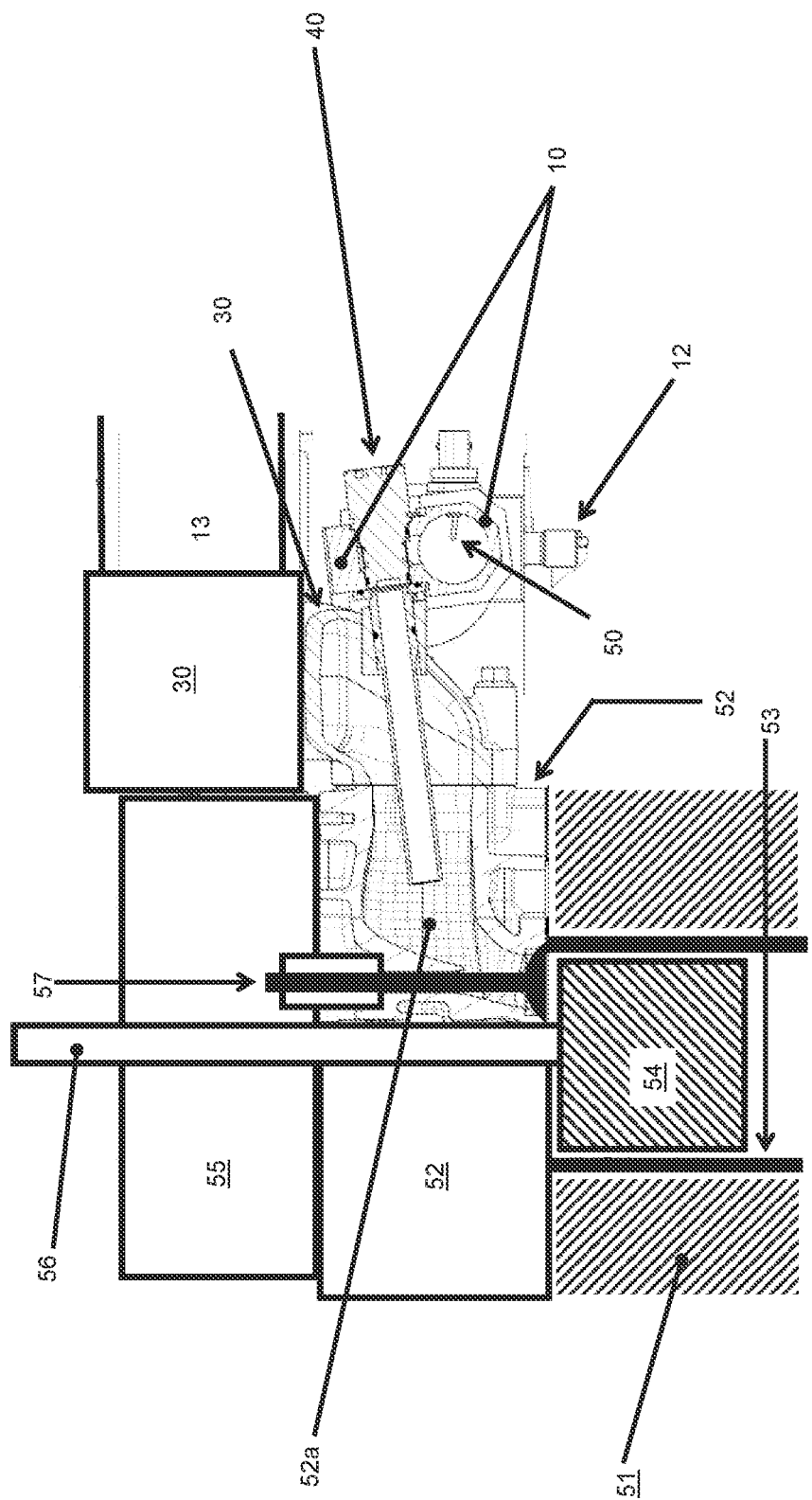
FIG. 5: a sectional view of the combustion engine according to the invention with attached air distributor, central rotor and injectors.

The sectional view of FIG. 5 shows the close-up area of the inlet port 52a to a combustion chamber 2. It is a section angled along the roofed longitudinal axis of the combustion chamber 2 under consideration. The exposed section of the cylinder head 52 shows the inlet port 52a and other cavities, for example cooling chambers. Since the latter are not related to the invention, any description is omitted here. To the right of the cylinder head 52 is mounted the air distributor 30, the lower portion of which is exposed in the section shown. As expected, the two inner contours of the air path visible in the drawing plane show a tangent transition at the transition from the air distributor 30 into the inlet port 52a located in the cylinder head 52. The section is selected such that the imaginary longitudinal axis of the injector 40 is located on the section plane. In relation to the air flow path, the injector 40 is positioned in such a way that its imaginary longitudinal axis and thus the flow direction of the injected fuel enters the flow field of the air in an angular position that is as advantageous as possible in this respect, which makes it possible to expect or prove that there is already extensive mixing of fuel and air on the common residual running distance along the inlet channel 52a.

The invention is not limited to spark ignited internal combustion engines. The presence of a spark plug 56 is based only on the exemplary embodiment.

FIG. 6 shows an enlarged section of the already known section in the transition area from the central rail 10 to the air distributor 30. In the embodiment example, this is an injector 40 consisting of two assemblies which are mounted separately from one another and which, in the installed state including an opening 16 of the central rail 10, are located on a common longitudinal axis and form an injector 40. The component arranged on the right side is an injector valve 41, the outlet of which is located on the front side facing the air distributor 30. The injector nozzle 43 arranged on the left-hand side has a tubular shape, at the end section 43a of which facing the injector valve 41 there is an increased outer diameter and at this end it is equipped with a flange (see detailed views of the injector 40 in FIG. 8) and, provided with a seal 43b, is screwed directly onto the central rail 10.

A support plate 46 is welded to the end section 43a of an injector nozzle 43 which has the larger outer diameter. Bores 46a in the carrier plate 46 are used for bolting to the central rail 10. The bolts required for this purpose can be inserted through the threaded bores 46b provided on the accessible surface of the central rail 10 (see FIG. 4) and passed through the central rail 10 into the bores 46a of the carrier plate 46. Sealing elements 46c inserted between the central rail 10 and the support plate 46 ensure that the fuel gas stored inside the central rail 10 is sealed off from the environment.

A section of the injector 40 is provided with an annular groove 42 having radial bores distributed around its circumference, allowing fuel to pass from the annular groove 42 to the injector nozzle 43 via the injector valve 41. A fluid connection 19 with a large cross-sectional area exists between the annular groove 42 and the rail inner volume 18. Seals 47 on the outer circumference of the injector valve 41 serve to prevent fuel leakage to the surroundings.

On the side facing the central rail 10, the wall of the air distributor 30 comprises through openings 34 for the injectors 40. In the vicinity of these passage openings 34, the housing is reinforced so that instead of simple housing holes, there is a bushing area 34a in each case (see FIG. 3), which forms a large-surface contact with the injector 40 in its end section 43a of the increased outer diameter, which ensures centering of the injectors 40 and sealing of these passage openings 34. Preferably, the bushing region 34a should already be produced by casting the air distributor 30 in its raw form. The final production of such a bushing region 34a is preferably limited to a finishing operation, by means of which a corresponding dimensional accuracy of the recesses already present in the casting blank is ensured.

The injector valve 41 is integrated in the central rail 10 in such a way that the rail housing is even a component of the injector housing (cf. FIG. 7). In the embodiment shown here, the section of the injector valve 41 with the electrical connections and thus the electrical part of the injector 40 is located outside the air distributor 30, where an air/gas mixture can in principle be present. Although a high excess of air would then be present in the air distributor 30, in the case of a hydrogen engine this spatial separation of the electrical system creates a safety advantage, since a hydrogen-air mixture is ignitable even with a very high excess of air and a very small energy input is already sufficient for ignition. The assembly and disassembly of the injector 40 is possible from the outside, in that only one fixing element needs to be screwed on or unscrewed (cf. FIGS. 4 and 8). The fixing element is formed as a retaining claw 45 which can be screwed to the rail housing. A half-opening of the retaining claw 45 can be inserted into a radial external groove 48 of the injector housing, whereby the injector 41 can be fixed in a precisely defined position on the central rail 10.

A rail pressure sensor 50 (see FIG. 5) can be inserted into the central rail in the area of the fuel connection 12 through a hole 50a from the outside.

The idea according to the invention can in principle be used for all internal combustion engines of the topologies commonly used today, including, for example, in-line, V- and flat engines. It can also be used for compression-ignition and spark-ignition internal combustion engines. The same applies to 2-stroke, 4-stroke, 2-valve, 4 valve engines with or without supercharging; engines with or without EGR. Also, the application can used equally be applied to internal combustion engines running on liquid or gaseous fuel independent of the type of fuel. Use is also possible for stationary and mobile engines, i.e. on-road, off-road, maritime, off-shore, etc. All designations listed in this section are to be understood as examples with the description not necessarily being exhaustive, and therefore the invention and accordingly the following patent claims are by no means limited to the engine configurations mentioned here.

The advantages of the invention will be briefly summarized again below:

- Elimination of numerous pipes in which pressurized fuel is guided from the rail 10 to the injectors 40. This reduces the amount of material and production efforts required for the components to be assembled, and thus reduces the amount of assembly required. Reducing the overall length of exposed high-pressure lines reduces the risk of damage and the secondary risks associated with such damage.
- There is a much better match between the measured rail pressure and the actual injection pressure in the intake manifold or intake port 52a; pressure losses over line lengths are reduced and/or running times for pressure fluctuations are shortened.
- The structure according to the invention favors a compact design of the internal combustion engine, in particular the structure enables
    - good accessibility and convenient disassembly/assembly of the injectors 40 or at least the injector valves 41.
    - simple guiding of the cables for powering the injectors 40 and for signal forwarding from sensors for measuring variables on or in the central rail 10 and the air distributor 30.
- A separation between the electrical section and the fuel section of the injector 40 is inherent.
- A preferred embodiment provides for the use of an integral component for the functions of the central rail 10 and those of the air distributor 30, the blank of which is preferably produced as a casting or molded part. The blank already includes all the necessary internal cavities, internal connections and the at least prepared external connections that are ultimately required to fulfill the functions of the air distributor 30 and the central rail 10. This measure eliminates the need for separate manufacture of a further comparatively costly casting. This eliminates the need for certain equipment for fasteners and for connecting and sealing certain fluid connections. It should be emphasized that these are those fittings which involve reworking of the casting and the mounting of additional components.

Secondary Advantages

It is well known that such pipelines have certain tolerances because bends have to be made during their manufacture. Due to such tolerances and the fact that several pipe connections have to be made when assembling an internal combustion engine, the assembly effort is not inconsiderable. Added to this is the mounting of various fixing elements that are required to limit the exposed pipe widths, since otherwise the vibration of the operated internal combustion engine can set the pipes into correspondingly pronounced oscillations. This is also advantageous because in certain applications the internal combustion engine is subjected to strong vibration, shock and impact loads, for example when it serves as the primary drive of a mobile machine.

If there are correspondingly high safety requirements or if the leakage of fuel would be correspondingly dangerous, for example because it is a gaseous fuel, the corresponding pipelines and connections would have to be configured correspondingly more safely and thus more elaborately, e.g. by using double-walled pipes, etc.

LIST OF REFERENCE CHARACTERS

Cylinder bank 1
Combustion chamber 2
Exhaust manifold 3
Central rail 10
Rail section parts 10a, 10b, 10c
Fuel connection 12
Charge air supply line 13
Exhaust gas 14
Mounting screw 15
Opening in the rail 16
Rail internal volume 18
Fluid connection 19
Air distributor 30
Contact surface air distributor 31
Mounting screws 32
Sleeves for fixing screws 32a
Passage openings 34
Socket area 34a
Seal 34b
Connection for charge air supply 35
Contact area 35a
Injector 40
Injector valve 41
Annular groove 42
Injector nozzle 43
End section 43a
Annular groove for seal 43b
Fixation element 45
Carrier plate 46
Bores 46a
Threaded hole 46b
Sealing elements 46c
Seals 47
Outside groove 48
Rail pressure sensor 50
Borehole 50a
Engine block 51
Cylinder head 52
Inlet duct 52a
Outlet duct 52b
Liner 53
Piston 54
Cylinder head cover 55
Spark plug 56

The invention claimed is:

1. Internal combustion engine with intake manifold injection, comprising
   at least two combustion chambers (2),
   a common central rail (10) for supplying fuel for the intake manifold injection to all said combustion chambers (2), and
   a common air distributor (30) for supplying air to all the individual combustion chambers (2), wherein
   the common central rail (10) and the common air distributor (30) are both formed together as an integral component from a single blank as a casting or molded part, and including all internal cavities, internal connections and external connections required to fulfill functions of the common air distributor (30) and the common central rail (10).

2. Internal combustion engine according to claim 1, wherein one or more fuel injectors (40) are at least partially installed in the central rail (10), and a component or region of the injector 40 located outside the central rail (10) comprises actuating components of the injector (40).

3. Internal combustion engine according to claim 2, wherein the actuating components of the injector (40) are electrical.

4. Internal combustion engine according to claim 2, wherein a longitudinal axis of the one or more injectors (40) installed in the central rail (10) is perpendicular to a longitudinal axis of the central rail (10).

5. Internal combustion engine according to claim 2, wherein the entire injector (40) or at least the component or region of the injector (40) located outside the central rail (10) can be dismantled and removed from outside the central rail (10).

6. Internal combustion engine according to claim 5, wherein the component or region of the injector (40) located outside the central rail (10) or the entire injector (40) is fixed by fixing means accessible from outside on the central rail (10), and only the fixing means accessible from the outside has to be mounted or released for installation and/or removal.

7. Internal combustion engine according to claim 6, wherein the fixing means are a retaining claw (45) screwed onto the central rail (10).

8. Internal combustion engine according to claim 5, wherein the component or region of the injector (40) located outside the central rail (10) comprises all actuating components of the injector (40).

9. Internal combustion engine according to claim 8, wherein the actuating components of the injector (40) are electrical components or electrical parts for injector actuation.

10. Internal combustion engine according to claim 1, wherein at least one injector (40) comprises, on a circumferential side, an annular groove (42) located inside the central rail (10) with one or more radial bores for fluid connection between the central rail (10) and the injector (40).

11. Internal combustion engine according to claim 10, wherein an injector part (41) which can be separated from the central rail (10) from the outside comprises the annular groove (42).

12. Internal combustion engine according to claim 1, wherein the central rail (10) and the air distributor (30) are configured to perform single-point or multi-point intake manifold injection.

13. Internal combustion engine according to claim 1, wherein the central rail (10) is configured in one or more parts.

14. Internal combustion engine according to claim 13, wherein the central rail (10) is configured in a longitudinal direction in a plurality of rail section parts (10a, 10b, 10c) which can be assembled.

15. Internal combustion engine according to claim 14, wherein at least one rail section part (10c) comprises a fuel connection (12) of the central rail (10) upstream in the direction of a primary fuel tank.

16. Internal combustion engine according to claim 15, wherein the rail section part (10c) comprising the fuel connection (12) is mountable with different orientation of the fuel connection (12) to the remaining section parts (10a, 10b) of the central rail (10).

17. Internal combustion engine according to claim 1, wherein a control system is provided and configured to carry out sequential and cylinder-specific fuel injection.

18. Internal combustion engine according to claim 1, wherein a gaseous fuel is used as primary fuel.

19. Internal combustion engine according to claim 18, which is a hydrogen combustion engine.

20. Internal combustion engine with intake manifold injection, comprising
- at least two combustion chambers (2),
- at least one central rail (10) for supplying fuel for the intake manifold injection, and
- at least one air distributor (30) for supplying air to the individual combustion chambers (2), wherein
- the central rail (10) is attached to the air distributor (30), or the central rail (10) and the air distributor (30) are formed as an integral component, and
- an injector nozzle (43) extends completely through the air distributor (30) and extends directly into an inlet duct (52a) of a cylinder head (52) of the combustion chamber (2) to be supplied with fuel.

\* \* \* \* \*